(12) United States Patent
Kasuya et al.

(10) Patent No.: US 8,794,412 B2
(45) Date of Patent: Aug. 5, 2014

(54) HYDRAULIC CLUTCH AND TRANSMISSION DEVICE PROVIDED WITH THE SAME

(75) Inventors: Satoru Kasuya, Nishio (JP); Hiroshi Katou, Kariya (JP); Takuya Ishii, Hiratsuka (JP); Norihiro Tokunaga, Nishio (JP); Kenta Tamabayashi, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 208 days.

(21) Appl. No.: 13/429,940

(22) Filed: Mar. 26, 2012

(65) Prior Publication Data

US 2012/0247905 A1    Oct. 4, 2012

(30) Foreign Application Priority Data

Mar. 30, 2011  (JP) .................................. 2011-074722
Oct. 20, 2011  (JP) .................................. 2011-231179

(51) Int. Cl.

| F16D 25/0638 | (2006.01) |
| F16D 25/10 | (2006.01) |
| F16D 25/12 | (2006.01) |
| F16D 21/06 | (2006.01) |
| F16D 13/68 | (2006.01) |
| F16D 48/02 | (2006.01) |

(52) U.S. Cl.
CPC ................ *F16D 21/06* (2013.01); *F16D 25/10* (2013.01); *F16D 2048/029* (2013.01); *F16D 25/0638* (2013.01); *F16D 13/683* (2013.01); *F16D 25/12* (2013.01)
USPC ................ 192/48.619; 192/85.25; 192/106 F

(58) Field of Classification Search
USPC ................ 192/48.619, 85.25, 106 F
See application file for complete search history.

(56) References Cited

U.S. PATENT DOCUMENTS

| 2,163,202 | A | * | 6/1939 | Kegresse ................ 192/106 F |
| 3,217,851 | A | * | 11/1965 | Mogk et al. ............. 192/106 F |
| 7,731,623 | B2 | | 6/2010 | Nishida et al. |
| 7,862,465 | B2 | | 1/2011 | Nishida et al. |
| 2009/0011892 | A1 | * | 1/2009 | Nishida et al. ............. 475/276 |
| 2009/0242348 | A1 | | 10/2009 | Ishikawa et al. |

FOREIGN PATENT DOCUMENTS

| JP | A-2004-92716 | 3/2004 |
| JP | A-2009-030654 | 2/2009 |
| JP | A-2009-030655 | 2/2009 |
| JP | A-2009-197851 | 9/2009 |
| JP | A-2009-243597 | 10/2009 |

OTHER PUBLICATIONS

Jun. 12, 2012 International Search Report issued in International Patent Application No. PCT/JP2012/056248 (with translation).

* cited by examiner

*Primary Examiner* — Rodney H Bonck
(74) *Attorney, Agent, or Firm* — Oliff PLC

(57) ABSTRACT

A hydraulic clutch including a clutch drum with an outer cylinder fitted with a plurality of clutch plates and a side wall; a clutch piston that defines together with the clutch drum an engagement oil chamber, and moves in an axial direction to press the clutch plates by hydraulic pressure supplied to the engagement oil chamber; and a cancel plate that defines together with the clutch piston a cancel oil chamber that cancels centrifugal hydraulic pressure. The side wall of the clutch drum is formed with a first oil passage that radially extends and is in communication with the engagement oil chamber, and a second oil passage that radially extends and is in communication with the cancel oil chamber. One of the first and second oil passages is at least partially included in a range of an axial width of the other of the first and second oil passages.

9 Claims, 7 Drawing Sheets

HYDRAULIC CLUTCH AND TRANSMISSION DEVICE PROVIDED WITH THE SAME

INCORPORATION BY REFERENCE

The disclosure of Japanese Patent Application Nos. 2011-074722 and 2011-231179 filed on Mar. 30, 2011 and Oct. 20, 2011, respectively, including the specifications, drawings and abstracts are incorporated herein by reference in their entirety.

BACKGROUND OF THE INVENTION

The present invention relates to a hydraulic clutch including a clutch drum that is fitted with a plurality of clutch plates; a clutch piston that together with the clutch drum defines an engagement side oil chamber; and a cancel plate that together with the clutch piston defines a cancel oil chamber for canceling centrifugal hydraulic pressure, and also relates to a transmission device provided with the hydraulic clutch.

DESCRIPTION OF THE RELATED ART

A past proposed example of a transmission device can transmit power applied to an input shaft to an output shaft, and change a speed ratio to a plurality of stages by switching the engagement states of a plurality of hydraulic clutches. The transmission device includes a first clutch, and a second clutch that is disposed inward of the first clutch so as to axially overlap with the first clutch (e.g., see Japanese Patent Application Publication No. 2009-30654 (JP 2009-30654 A)). The first clutch of this transmission device includes a clutch drum formed from an outer drum and an inner drum. The outer drum holds a plurality of friction plates. The inner drum can rotate together with the outer drum, and holds a piston member that can move in the axial direction so as to press the plurality of friction plates with a portion of the outer drum used as a cylinder. A first clearance that extends circumferentially outward from the input shaft side of the transmission device is provided between the outer drum and the inner drum as an oil passage to a hydraulic servo of the first clutch. A second clearance that extends circumferentially outward from the input shaft side of the transmission device is provided between the clutch drum of the first clutch and a clutch drum of the second clutch as an oil passage to a cancel oil chamber of the first clutch.

SUMMARY OF THE INVENTION

However, in the transmission device according to the related art described above, the radially-extending first clearance that serves as the oil passage to the hydraulic servo and the radially-extending second clearance that serves as the oil passage to the cancel oil chamber of the first clutch are arranged parallel in the axial direction. This increases the axial length of the transmission device, and hinders efforts to make a hydraulic clutch and a transmission device provided with the hydraulic clutch more compact. In addition, forming the first clearance that serves as the oil passage to the hydraulic servo of the first clutch requires members other than the structural members of the first clutch (the clutch drum of the second clutch in the transmission device of JP 2009-30654 A), which may increase the number of parts and result in a more complicated and larger device overall.

The present invention provides a hydraulic clutch with a compact and simple configuration, and a transmission device provided with the hydraulic clutch.

The hydraulic clutch of the present invention employs the following to achieve the above.

A hydraulic clutch according to the present invention includes a clutch drum that includes at least an outer cylinder portion that is fitted with a plurality of clutch plates, and a side wall portion; a clutch piston that defines together with the clutch drum an engagement side oil chamber, and moves in an axial direction so as to press the clutch plates by hydraulic pressure supplied to the engagement side oil chamber; and a cancel plate that defines together with the clutch piston a cancel oil chamber that cancels centrifugal hydraulic pressure. In the hydraulic clutch, the side wall portion of the clutch drum is formed with a first oil passage that radially extends and is in communication with the engagement side oil chamber, and a second oil passage that radially extends and is in communication with the cancel oil chamber, and one of the first and second oil passages is at least partially included in a range of an axial width of the other of the first and second oil passages.

In the hydraulic clutch, the side wall portion of the clutch drum is formed with the first oil passage that radially extends and is in communication with the engagement side oil chamber, and the second oil passage that radially extends and is in communication with the cancel oil chamber. In addition, one of the first and second oil passages is at least partially included in the range of the axial width of the other of the first and second oil passages. Thus, the first oil passage for supplying oil to the engagement side oil chamber and the second oil passage for supplying oil to the cancel oil chamber are formed on substantially the same plane within the side wall portion of the clutch drum. Therefore, the first and second oil passages are not formed parallel in the axial direction, and an increase in the axial length of the hydraulic clutch can be suppressed. In addition, the first and second oil passages are both formed within the side wall portion of the clutch drum. There is thus no need to use a separate member for forming the oil passages. Moreover, an increase in the number of parts can be suppressed and the hydraulic clutch can have a more simple and downsized configuration. Consequently, according to the present invention, a hydraulic clutch with a compact and simple configuration can be achieved.

The first oil passage and the second oil passage may each be formed in a plurality in the side wall portion of the clutch drum so as to alternate with each other in a radiating manner. By thus forming the first and second oil passages so as to alternate with each other in a radiating manner, the first oil passages and the second oil passages do not overlap with each other as viewed from the axial direction, and an increase in the axial length of the hydraulic clutch can be suppressed. In addition, oil can be equally supplied to the engagement side oil chamber and the cancel oil chamber.

Further, the first and second oil passages may each be formed from a hole portion that is formed penetrating radially inward from an outer periphery of the side wall portion of the clutch drum, and an opening portion of the hole portion positioned on an outer circumferential side of the side wall portion may be closed by a lid element. Thus, the first and second oil passages can be easily formed.

A transmission device according to the present invention is provided with the hydraulic clutch according to any of the above descriptions, wherein the hydraulic clutch is a first hydraulic clutch. The transmission device further includes a second hydraulic clutch that is disposed circumferentially inward of the first hydraulic clutch. In other words, according to the present invention, an increase in the axial length of the transmission device can be suppressed, while also supplying oil to the engagement side oil chamber and the cancel oil chamber of the first hydraulic clutch that is disposed outward of the second hydraulic clutch.

In addition, the second hydraulic clutch may include a second clutch drum that is disposed circumferentially inward of the clutch drum; a clutch hub that is disposed circumferentially inward of the second clutch drum; a plurality of second clutch plates that is fitted in an alternating manner to an inner periphery of the second clutch drum and an outer periphery of the clutch hub; and a second clutch piston that defines together with the clutch drum a second engagement side oil chamber, and moves in the axial direction so as to press the second clutch plates by hydraulic pressure supplied to the second engagement side oil chamber. A ring-shaped fixing portion may axially extend from the side wall portion of the clutch drum. An aligning portion may be formed axially extending from an inner circumferential side of the fixing portion, and the cancel plate of the first hydraulic clutch and the second clutch drum may be fitted to the aligning portion of the fixing portion. The second oil passage may be in communication with the cancel oil chamber through an oil passage formed in the fixing portion of the clutch drum. It is thus possible to dispose the first hydraulic clutch and the second hydraulic clutch so as to overlap as viewed from the radial direction with the second oil passage and the cancel oil chamber in communication with each other.

The clutch drum may include an inner cylinder portion that axially extends from an inner circumferential portion of the side wall portion, and the inner cylinder portion may be fitted with a cylindrical sleeve that is rotatably supported by a fixed member of the transmission device such that the sleeve rotates together with the inner cylinder portion. In addition, the first oil passage may be in communication with a first supply passage formed in the fixed member through a first oil hole formed in the sleeve and a first relay oil passage formed in the inner cylinder portion, and the second oil passage may be in communication with a second supply passage formed in the fixed member through a second oil hole formed in the sleeve and a second relay oil passage formed in the inner cylinder portion. Thus, even if the first and second supply passages formed in the fixed member of the transmission device have a simplified structure, the first and second oil passages can easily be in respective communication with the first and second supply passages.

DETAILED DESCRIPTION OF THE EMBODIMENT

Next, an embodiment of the present invention will be described.

Figure 1:
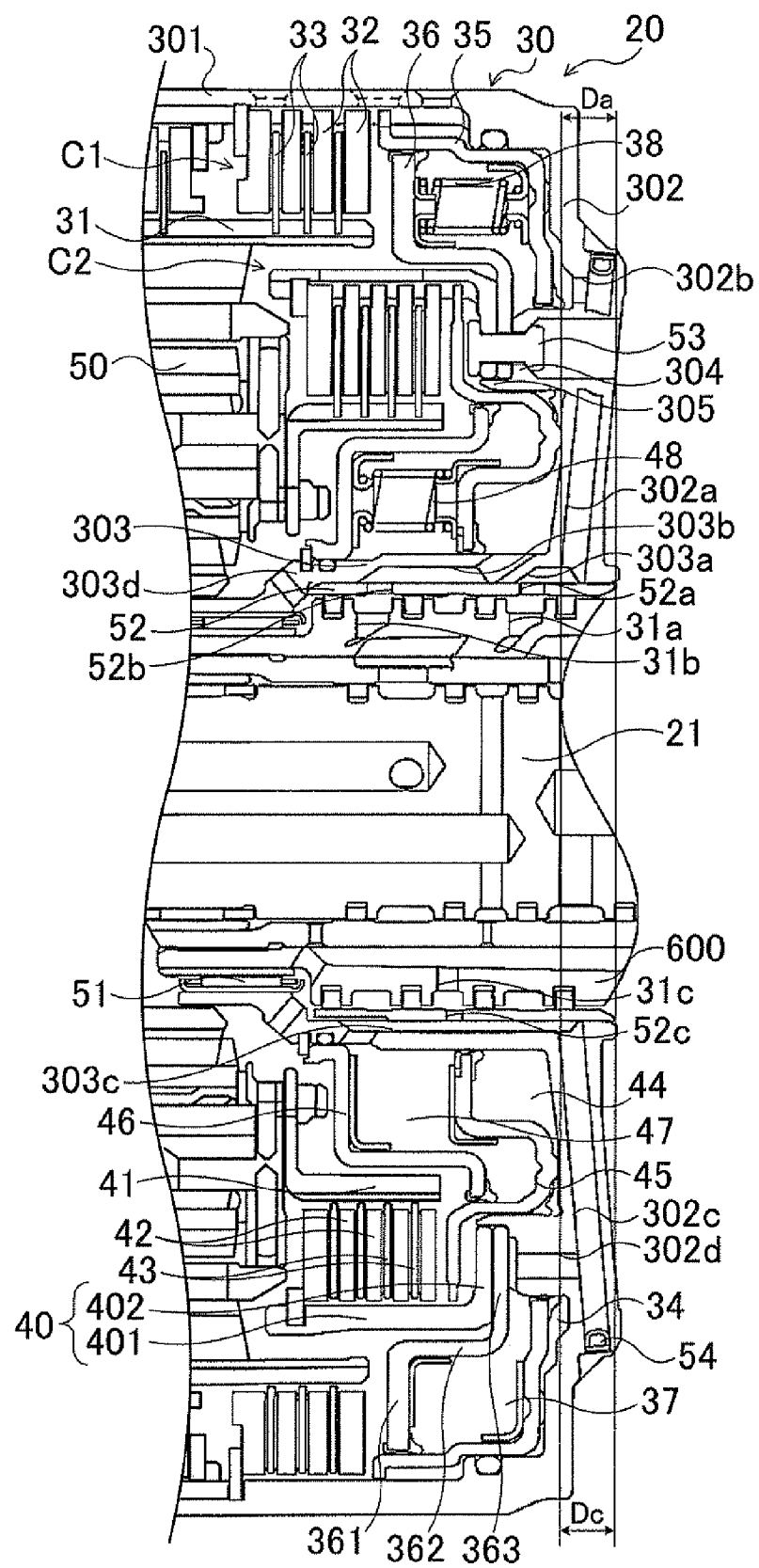
FIG. 1 is a sectional view that shows an essential portion of an automatic transmission 20 provided with clutches C1 and C2 according to an embodiment of the present invention.

FIG. 1 is an enlarged sectional view that shows an essential portion of an automatic transmission 20 provided with clutches C1 and C2 according to an embodiment of the present invention. The automatic transmission 20 according to the embodiment is configured as a stepped transmission and mounted in a vehicle. As shown in FIG. 1, the automatic transmission 20 includes an input shaft 21, as well as the clutches C1 and C2, a plurality of other clutches and brakes (not shown), and a planetary gear mechanism 50 for changing a power transmission path from the input shaft 21 to an output shaft (not shown). The clutches C1 and C2, the plurality of other clutches and brakes, and the planetary gear mechanism 50 are accommodated inside a transmission case (not shown). Note that the input shaft 21 of the automatic transmission 20 is connected to a crankshaft of an engine through a torque converter or the like, and the output shaft is connected to a drive wheel through a differential mechanism (differential gear) or the like (none of which are shown in the drawings).

The clutch C1 is configured as a multi-plate friction hydraulic clutch. The clutch C1 includes a clutch drum 30 that is supported rotatable around the input shaft 21 through a bearing 51; a clutch hub 31 that is fixed to a ring gear, for example, of the planetary gear mechanism 50; a plurality of ring-shaped clutch plates (mating plates) 32 that is slidably supported on an inner circumferential surface of the clutch drum 30 through a spline; a plurality of ring-shaped clutch plates (friction plates) 33 that is slidably supported on an outer circumferential surface of the clutch hub 31 through a spline; a clutch piston 35 that is fitted axially slidable on the inner circumferential surface of the clutch drum 30 and movable toward the clutch plates 32, 33, and defines together with the clutch drum 30 a first engagement side oil chamber 34; a cancel plate 36 that defines together with the clutch piston 35 a first cancel oil chamber 37 for canceling centrifugal hydraulic pressure generated inside the first engagement side oil chamber 34; and a return spring 38 that is disposed between the clutch piston 35 and the cancel plate 36. The clutch drum 30 is configured from a first outer cylinder portion 301 that is fitted with the clutch plates 32, a first side wall portion 302 that extends radially inward from an end of the first outer cylinder portion 301, and an inner cylinder portion 303 that axially extends from an inner circumferential portion of the first side wall portion 302. The inner cylinder portion 303 of the clutch drum 30 is press-fit (fitted) with a sleeve 52 so as to enable the sleeve 52 to rotate together with the inner cylinder portion 303. The sleeve 52 is rotatably supported by a fixed member (fixed shaft) 600 that is integrated with the transmission case, for example, and rotatably supports the input shaft 21. Thus, the clutch drum 30 is rotatable around the axis of the input shaft 21. One end surface (on the left side of the figure) of the sleeve 52 contacts an inner surface of a stepped portion 303d formed on the inner cylinder portion 303, whereby the sleeve 52 is positioned in the axial direction.

The clutch C2 is configured as a multi-plate friction hydraulic clutch, and disposed circumferentially inward of the clutch C1 so as to overlap with the clutch C1 as viewed from the radial direction. The clutch C2 includes a clutch drum (second clutch drum) 40 that contacts (axially supports) a radially-extending inner circumferential portion of the cancel plate 36 biased by the return spring 38 toward the left side of the figure, and fastened to the clutch drum 30 together with the cancel plate 36; a clutch hub 41 that is fixed to a carrier, for example, of the planetary gear mechanism 50; a plurality of ring-shaped clutch plates (mating plates) 42 that is slidably supported on an inner circumferential surface of the clutch drum 40 through a spline; a plurality of ring-shaped clutch plates (friction plates) 43 that is slidably supported on an outer circumferential surface of the clutch hub 41 through a spline; a clutch piston 45 that is fitted axially slidable on the inner circumferential surface of the clutch drum 40 and movable toward the clutch plates 42, 43, and defines together with the clutch drum 30 a second engagement side oil chamber 44; a cancel plate 46 that defines together with the clutch piston 45 a second cancel oil chamber 47 for canceling centrifugal hydraulic pressure generated inside the second engagement side oil chamber 44; and a return spring 48 that is disposed between the clutch piston 45 and the cancel plate 46. The clutch drum 40 is configured from a second outer cylinder portion 401 that supports the clutch plates 42, and a second side wall portion 402 that extends radially inward from an end of the second outer cylinder portion 401.

A ring-shaped fixing portion 304 extends axially inward from a substantially radial center portion of the first side wall portion 302 of the clutch drum 30 of the clutch C1. A ring-shaped aligning portion 305 also extends axially inward from an end portion on the inner circumferential side of the fixing portion 304. The cancel plate 36 of the clutch C1 includes an outer circumferential portion 361 that slidingly contacts an inner circumferential portion of the clutch piston 35 through a seal member; a coupling portion 362 that axially extends from the outer circumferential portion 361; and an inner circumferential portion 363 that extends radially inward from the coupling portion 362. One end surface of the inner circumferential portion 363 contacts a radially inward end surface of the fixing portion 304 of the clutch drum 30 and the other end surface of the inner circumferential portion 363 contacts the second side wall portion 402 of the clutch drum 40 of the clutch C2. In this state, the cancel plate 36 is fitted to an outer circumferential surface of the aligning portion 305, which extends from the fixing portion 304, together with the second side wall portion 402 of the clutch drum 40.

Figure 2:
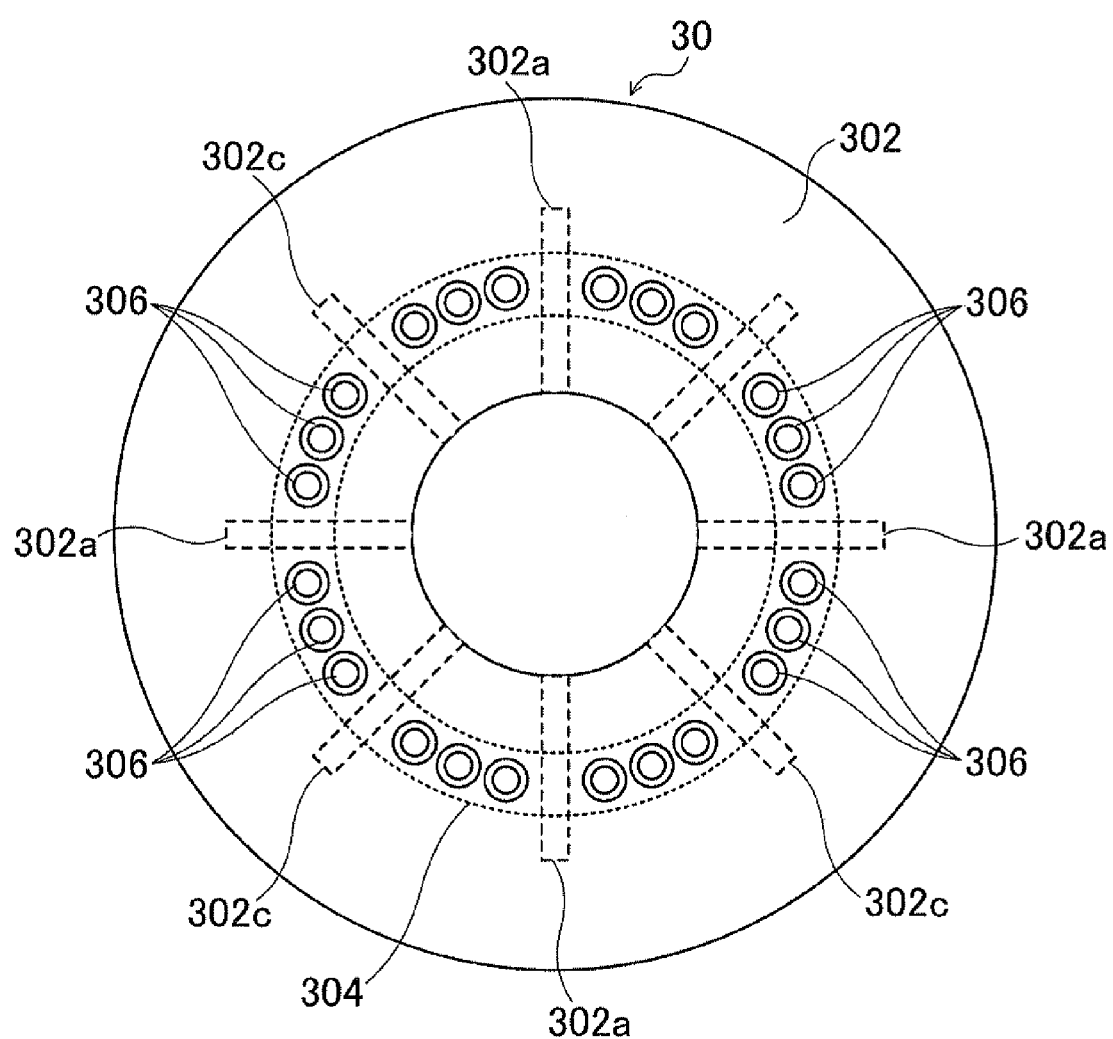
FIG. 2 is a frontal view of a clutch drum 30 as seen from the right side in FIG. 1.
Figure 3:
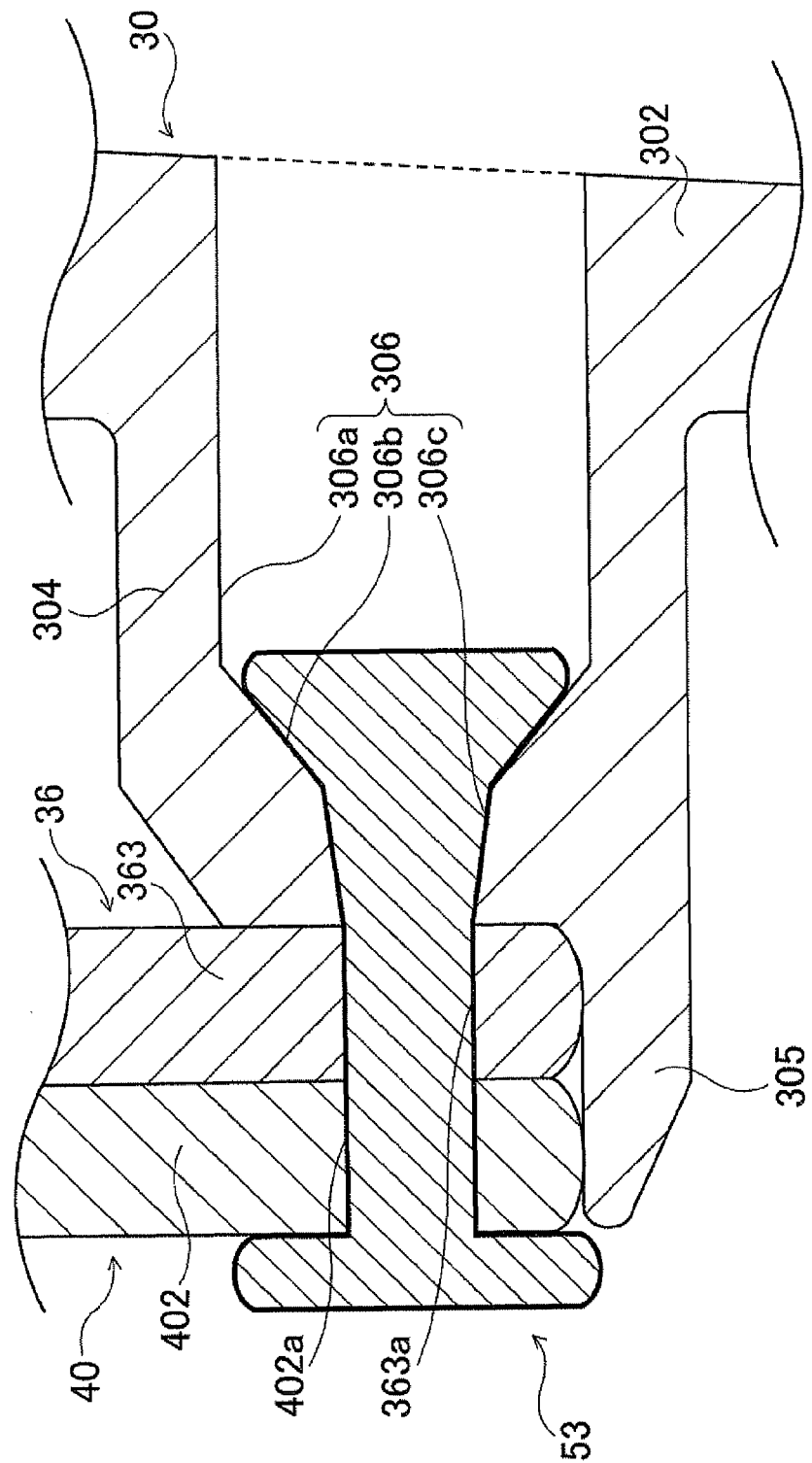
FIG. 3 is an enlarged sectional view that shows a fixing portion 304 of the clutch drum 30 and a surrounding area.

FIG. 2 is a frontal view of the clutch drum 30 as seen from the right side in FIG. 1. FIG. 3 is an enlarged sectional view that shows an essential portion of the fixing portion 304. As shown in the figures, the fixing portion 304 of the clutch drum 30 is formed with a plurality of rivet holes 306 that extends axially inward from an end surface of the first side wall portion 302 of the clutch drum 30. Each of the plurality of rivet holes 306 is formed of a first hole portion 306a that extends axially inward from the end surface of the first side wall portion 302, a second hole portion 306b that extends axially inward from the first hole portion 306a such that an inner diameter of the second hole portion 306b gradually decreases, and a third hole portion 306c that extends further axially inward from the second hole portion 306b such that an inner diameter of the third hole portion 306c gradually decreases. The cancel plate 36 of the clutch C1 is also formed with a plurality of rivet holes 363a, each of which is in communication with the third hole portion 306c of the rivet hole 306 of the fixing portion 304 when the inner circumferential portion 363 of the cancel plate 36 is fitted to the aligning portion 305. In addition, the second side wall portion 402 of the clutch drum 40 of the clutch C2 is formed with a plurality of rivet holes 402a, each of which is in communication with the rivet hole 363a of the cancel plate 36 when the inner circumferential portion of the second side wall portion 402 is fitted to the aligning portion 305. A rivet 53 is inserted in the rivet holes 306, 363a, and 402a. The rivet 53 is caulked from axially outward of the clutch drum 30 to fasten together the cancel plate 36 and the second side wall portion 402 of the clutch drum 40 to the fixing portion 304 of the clutch drum 30. Thus, the clutch drum 30, the cancel plate 36, and the clutch drum 40 can be easily fastened together, and the cancel plate 36 is axially supported by the second side wall portion 402 of the clutch drum 40 that contacts the inner circumferential portion 363. Note that the clutch drum 30, the cancel plate 36, and the clutch drum 40 may be fastened together by a bolt and a nut.

The clutch piston 35 of the clutch C1 is supported axially slidable by the fixing portion 304 of the clutch drum 30 through a seal member, and slidingly contacts an inner circumferential surface of the first outer cylindrical portion 301 of the clutch drum 30 through a seal member. The clutch piston 35 thus defines, together with the first outer cylinder portion 301, the first side wall portion 302, and the fixing portion 304 of the clutch drum 30, the first engagement side oil chamber 34. The clutch piston 45 of the clutch C2 is supported axially slidable by the inner cylinder portion 303 of the clutch drum 30 through a seal member, and slidingly contacts an inner circumferential surface of the fixing portion 304 of the clutch drum 30 through a seal member. The clutch piston 45 thus defines, together with the inner cylinder portion 303, the first side wall portion 302, and the fixing portion 304 of the clutch drum 30, the second engagement side oil chamber 44. By utilizing the fixing portion 304 formed on the first side wall portion 302 of the clutch drum 30 in this manner, the clutches C1 and C2 can be easily configured.

The fixed member 600 is foamed with supply passages 31a, 31b that are connected to a hydraulic control device (not shown) through an oil passage (not shown) formed in the input shaft 21. The fixed member 600 is also formed with a supply passage 31c to which drained hydraulic oil is supplied from a hydraulic circuit of a lubrication system (not shown) that supplies lubricating oil to a lubrication target such as the planetary gear mechanism 50 mounted in the automatic transmission 20. In addition, the sleeve 52 press-fit to the clutch drum 30 of the clutch C1 is formed with an oil hole 52a that is in communication with the supply passage 31a formed in the fixed member 600, and an oil hole 52b that is in communication with the supply passage 31b. The inner cylinder portion 303 of the clutch drum 30 is formed with a relay oil passage 303a that is in communication with the oil hole 52a of the sleeve 52, and a relay oil passage 303b that is in communication with the oil hole 52b. The relay oil passage 303b is in communication with the second engagement side oil chamber 44. As shown in FIGS. 1 and 2, the first side wall portion 302 of the clutch drum 30 is formed with a plurality (four in the embodiment) of first oil passages 302a that radially extend in a radiating manner. Each of the plurality of first oil passages 302a on the inner circumferential side thereof is in communication with the relay oil passage 303a formed in the inner cylinder portion 303, and also in communication with the first engagement side oil chamber 34 through an oil passage 302b that is more circumferentially outward than the fixing portion 304 and axially extends through an inner portion of the first side wall portion 302. Thus, the hydraulic control device and the first engagement side oil chamber 34 are connected through the supply passage 31a of the fixed member 600, the relay oil passage 303a of the inner cylinder portion 303 of the clutch drum 30, and the first oil passage 302a and the oil passage 302b of the first side wall portion 302. Also, the hydraulic control device and the second engagement side oil chamber 44 are connected through the supply passage 31b of the fixed member 600, and the relay oil passage 303b of the inner cylinder portion 303 of clutch drum 30.

Figure 4:
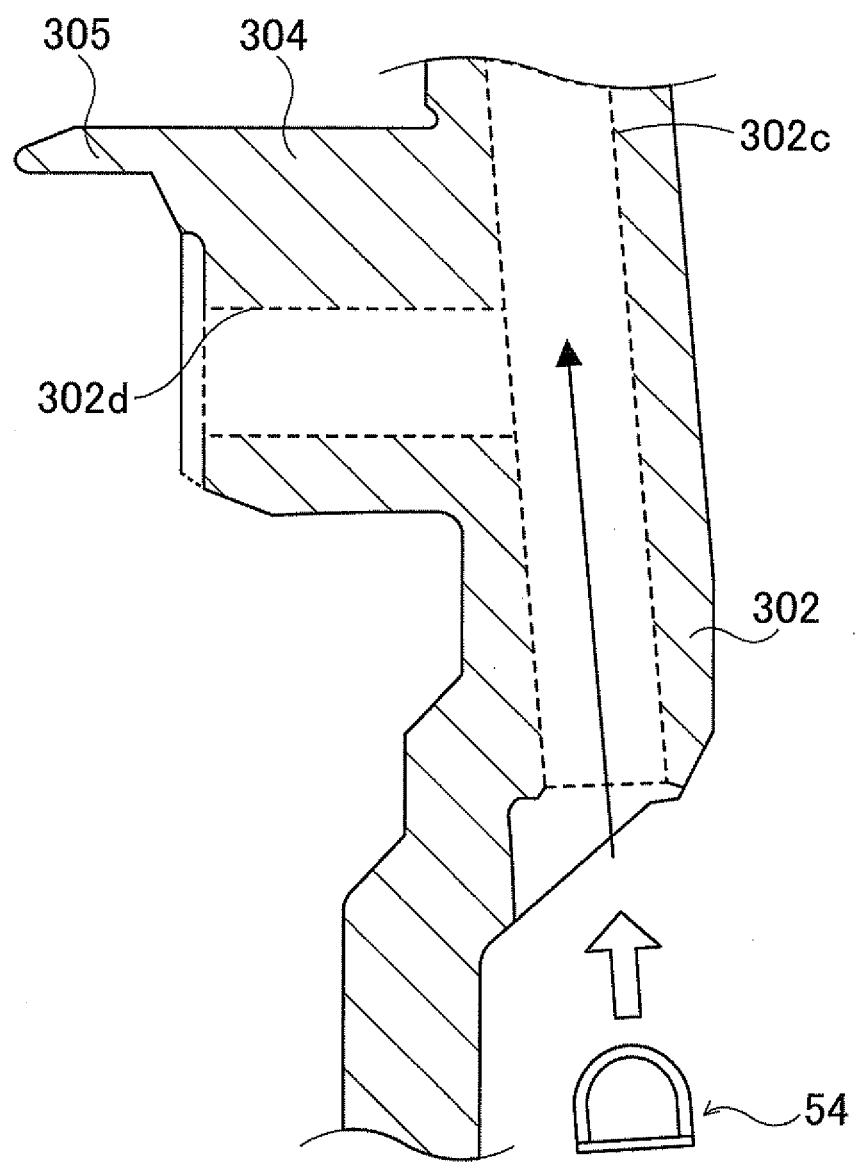
FIG. 4 is an enlarged sectional view that shows a second oil passage 302c formed in a first side wall portion 302 of the clutch drum 30 and a surrounding area.

In addition, the sleeve 52 press-fit to the clutch drum 30 of the clutch C1 is formed with an oil hole 52c that is in communication with a supply passage 31c formed in the fixed member 600. The inner cylinder portion 303 of the clutch drum 30 is formed with a relay oil passage 303c that is in communication with the oil hole 52c of the sleeve 52. The relay oil passage 303c is formed so as to axially extend on an inner circumferential surface of the inner cylinder portion 303 of the clutch drum 30, and an end (an end portion on the left side of FIG. 1) of the relay oil passage 303c radially extends and is in communication with the second cancel oil chamber 47 of the clutch C2. As shown in FIGS. 1 and 2, the first side wall portion 302 of the clutch drum 30 is formed with a plurality (four in the embodiment) of second oil passages 302c that radially extend in a radiating manner that alternates with the plurality of first oil passages 302a so as not to overlap with the plurality of first oil passages 302a as viewed from the axial direction. Each of the plurality of second oil passages 302c on the inner circumferential side thereof is in communication with the relay oil passage 303c formed in the inner cylinder portion 303, and also in communication with the first cancel oil chamber 37 through an oil passage 302d that axially extends through an inner portion of the fixing portion 304. Thus, a draining oil passage of the hydraulic circuit of the lubrication system and the first cancel oil chamber 37 communicate through the supply passage 31c of the fixed member 600, the relay oil passage 303c of the inner cylinder portion 303 of the clutch drum 30, the second oil passage 302c of the first side wall portion 302, and the oil passage 302d. Also, the draining oil passage of the hydraulic circuit of the lubrication system and the second cancel oil chamber 47 communicate through the supply passage 31c of the fixed member 600, and the relay oil passage 303c of the inner cylinder portion 303 of clutch drum 30. In the embodiment, as shown in FIG. 1, an axial width Da of the first oil passage 302a and an axial width Dc of the second oil passage 302c are set uniform. In other words, the second oil passage 302c is included within the range of the axial width Da of the first oil passage 302a, and the first oil passage 302a is included within the range of the axial width Dc of the second oil passage 302c. By thus forming the first oil passages 302a and the second oil passages 302c on substantially the same plane inside the first side wall portion 302, an increase in the axial length of the clutches C1, C2 can be suppressed. In addition, by alternately forming the first oil passages 302a and the second oil passages 302c as viewed from the axial direction, the first oil passages 302a and the second oil passages 302c do not overlap with each other as viewed from the axial direction, and an increase in the axial length of the clutch C1 as well as that of the automatic transmission 20 that includes the clutch C1 and the clutch C2 can be suppressed. In addition, hydraulic oil can be equally supplied to the first engagement side oil chamber 34 and the first cancel oil chamber 37 formed into ring shapes. Here, as shown by an arrow in FIG. 4, the first and second oil passages 302a, 302c described above can be easily formed by forming a hole portion penetrating radially inward from an outer periphery of the first side wall portion 302 of the clutch drum 30, and then press-fitting a plug (lid element) 54 to an opening portion of the hole portion positioned on the outer circumferential side of the first side wall portion 302 as shown by a white arrow in FIG. 4 to close the opening portion.

Figure 5:
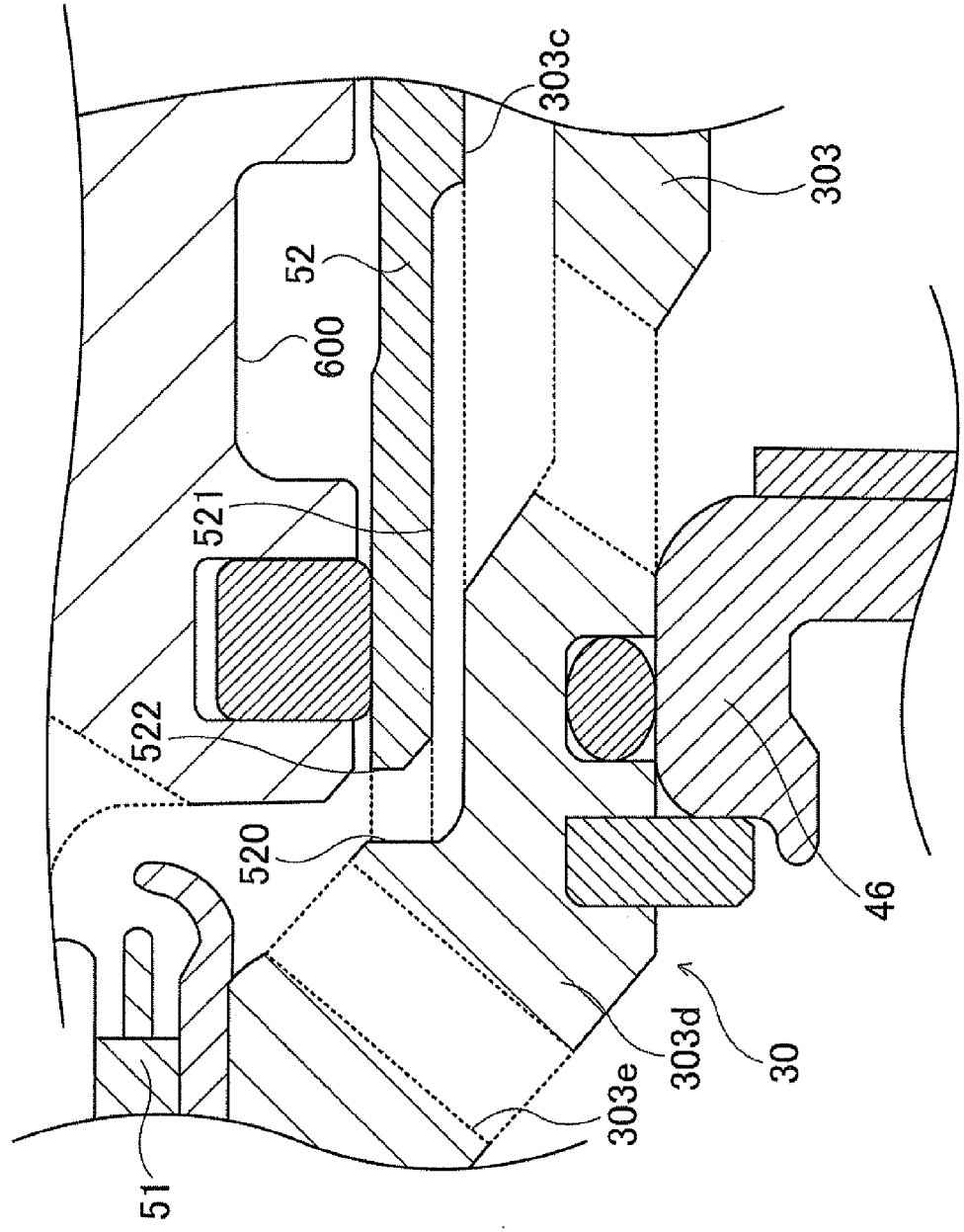
FIG. 5 is an enlarged sectional view that shows a portion of contact between a sleeve 52 and a stepped portion 303d of an inner cylinder portion 303 of the clutch drum 30.
Figure 6:
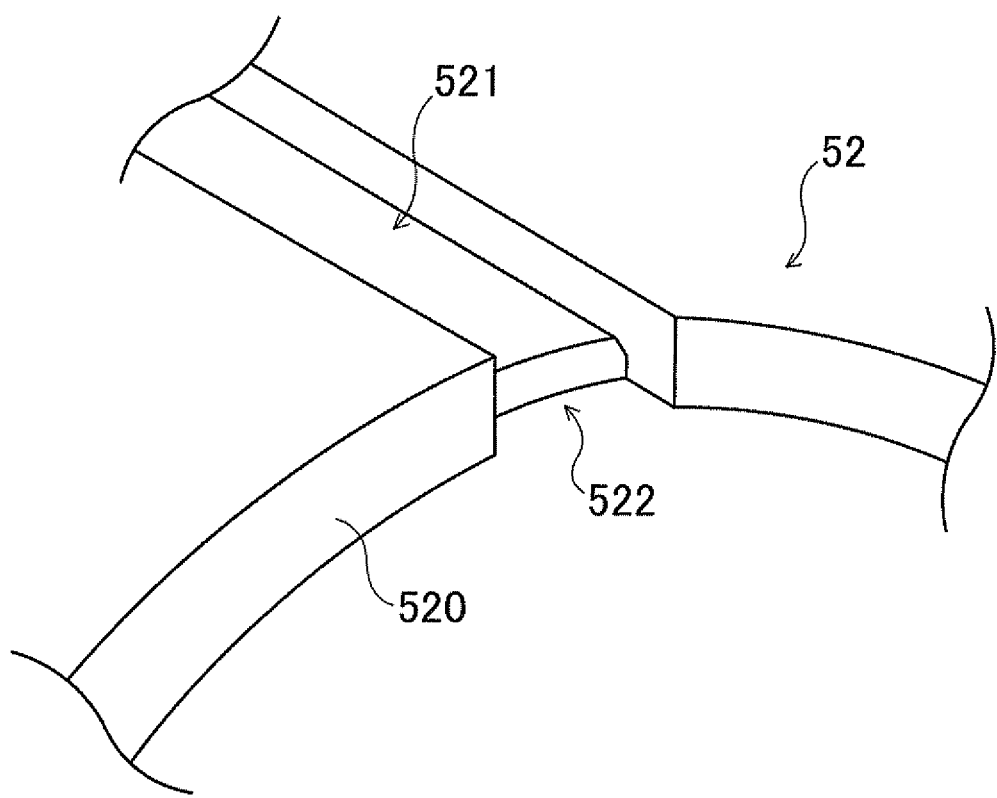
FIG. 6 is an enlarged view of an essential portion that shows an end portion of the sleeve 52.

FIG. 5 is an enlarged sectional view that shows a portion of contact between the sleeve 52 and the stepped portion 303d of the inner cylinder portion 303 of the clutch drum 30. FIG. 6 is an enlarged view of an essential portion that shows an end portion of the sleeve 52. As shown in the figures, at the end portion of the sleeve 52, a first passage 521 is formed at a plurality of locations (eight locations in the embodiment) on an outer periphery of the sleeve 52. Each first passage 521 is in communication with the relay oil passage 303c formed in the inner circumferential surface of the inner cylinder portion 303 of the clutch drum 30, and axially extends toward an end surface 520 that contacts the stepped portion 303d of the inner cylinder portion 303. In addition, at the end portion of the sleeve 52, a second passage 522 is formed at a plurality of locations (eight locations in the embodiment). Each second passage 522 is formed more axially recessed than the end surface 520 that contacts the stepped portion 303d of the inner cylinder portion 303, and radially extending to provide communication between the first passage 521 and an inner portion of the sleeve 52. The second passage 522 is formed so as to open widest at a position that is in communication with the first passage 521, and gradually narrow in the axial direction in the vicinity of a radial center portion of the sleeve 52 from the position at which the second passage 522 is in communication with the first passage 521, after which the second passage 522 has the same cross-sectional shape up to the inner circumferential surface of the sleeve 52. The stepped portion 303d of the inner cylinder portion 303 is formed with an oil passage 303e as shown in the figure.

Next, the operation to supply hydraulic oil to the oil chambers of the clutches C1, C2 of the automatic transmission 20 thus configured will be described. When engaging the clutch C1 of the embodiment, hydraulic oil from the hydraulic control device is supplied to the first engagement side oil chamber 34 through the supply passage 31a of the fixed member 600, the relay oil passage 303a of the inner cylinder portion 303 of the clutch drum 30, and the first oil passage 302a and the oil passage 302b of the first side wall portion 302. Thus, hydraulic pressure acting on the first engagement side oil chamber 34 causes the clutch piston 35 to move toward the clutch plates 32, 33 such that the clutch plates 32, 33 are sandwiched between the clutch piston 35 and a contact member fixed to the clutch drum 30, thus coupling the clutch drum 30 and the clutch hub 31 by the friction force acting between the clutch plates 32, 33. When disengaging the clutch C1, the hydraulic control device (not shown) stops the supply of hydraulic pressure to the first engagement side oil chamber 34, and the clutch piston 35 is biased by the return spring 38 to move toward the reverse side of the clutch plates 32, 33, thus disengaging the coupling of the clutch drum 30 and the clutch hub 31. When engaging the clutch C2, hydraulic oil from the hydraulic control device is supplied to the second engagement side oil chamber 44 through the supply passage 31b of the fixed member 600, and the relay oil passage 303b of the inner cylinder portion 303 of the clutch drum 30. Thus, hydraulic pressure acting on the second engagement side oil chamber 44 causes the clutch piston 45 to move toward the clutch plates 42, 43 such that the clutch plates 42, 43 are sandwiched between the clutch piston 45 and a contact member fixed to the clutch drum 40, thus coupling the clutch drum 40 and the clutch hub 41 by the friction force acting between the clutch plates 42, 43. When disengaging the clutch C2, the hydraulic control device (not shown) stops the supply of hydraulic pressure to the second engagement side oil chamber 44, and the clutch piston 45 is biased by the return spring 48 to move toward the reverse side of the clutch plates 42, 43, thus disengaging the coupling of the clutch drum 40 and the clutch hub 41.

If the automatic transmission 20 is operated with the first and second engagement side oil chambers 34, 44 filled with hydraulic oil as described above, centrifugal hydraulic pressure is generated in the first and second engagement side oil chambers 34, 44. Therefore, even if the supply of hydraulic pressure to the first and second engagement side oil chambers 34, 44 is stopped in order to disengage the clutches C1 and C2, the clutch pistons 35, 45 may remain pressed axially inward (toward the left side in FIG. 1) by the centrifugal hydraulic pressure, thus delaying disengagement of the clutches C1, C2. Therefore, when the automatic transmission 20 operates with the first and second engagement side oil chambers 34, 44 filled with hydraulic oil, the drained hydraulic oil from the hydraulic circuit of the lubrication system is supplied to the first cancel oil chamber 37 of the clutch C1 through the supply passage 31c of the fixed member 600, the relay oil passage 303c of the inner cylinder portion 303 of the clutch drum 30, and the second oil passage 302c of the first side wall portion 302, and the oil passage 302d. Also, the drained hydraulic oil from the hydraulic circuit of the lubrication system is supplied to the second cancel oil chamber 47 of the clutch C2 through the supply passage 31c of the fixed member 600, and the relay oil passage 303c of the inner cylinder portion 303 of clutch drum 30. As a consequence, centrifugal hydraulic pressure is also generated in the first and second cancel oil chambers 37, 47, and the centrifugal hydraulic pressure presses the clutch pistons 35, 45 axially outward (toward the right side in FIG. 1) so that a force caused by the centrifugal hydraulic pressure generated in the first and second engagement side oil chambers 34, 44 and acting on the clutch pistons 35, 45 can be canceled out.

In this case, immediately after the vehicle starts operating, the first and second cancel oil chambers 37, 47 are not fully filled with hydraulic oil and there is still air inside the first and second cancel oil chambers 37, 47. The air still inside the first cancel oil chamber 37 is discharged to outside the clutch C1 through the oil passage 302d, the second oil passage 302c of the first side wall portion 302, the relay oil passage 303c of the inner cylinder portion 303 of the clutch drum 30, and the first and second passages 521, 522 formed in the sleeve 52 when hydraulic oil is supplied to inside the first cancel oil chamber 37. The air still inside the second cancel oil chamber 47 is discharged to outside the clutch C2 through the oil passage 302d, the second oil passage 302c of the first side wall portion 302, the relay oil passage 303c of the inner cylinder portion 303 of the clutch drum 30, and the first and second passages 521, 522 formed in the sleeve 52. At such time, hydraulic oil having a high specific gravity moves by centrifugal force circumferentially outward inside the first and second cancel oil chambers 37, 47, which causes air inside the first and second cancel oil chambers 37, 47 to move circumferentially inward. Therefore, by using the second passage 522 that extends radially inward along the end surface 520 of the sleeve 52 as part of a path for discharging air, the air inside the first and second cancel oil chambers 37, 47 can be quickly discharged to outside while also suppressing an outflow of hydraulic oil through the second passage 522. In addition, the second passage 522 that provides communication between the first passage 521 and the inner portion of the sleeve 52 extends from the outer circumferential surface to the inner circumferential surface of the sleeve 52. Therefore, the zero-origin of the centrifugal hydraulic pressure in the first and second cancel oil chambers 37, 47 can correspond to the inner circumferential surface of the sleeve 52. As a consequence, it is possible to suppress the outflow of hydraulic oil while promoting the discharge of air when filling the first and second cancel oil chambers 37, 47 with hydraulic oil, and more suitably secure centrifugal hydraulic pressure in the first and second cancel oil chambers 37, 47. Note that the air discharged to outside the clutches C1, C2 through the first and second passages 521, 522 of the sleeve 52 is discharged through an inner portion of the transmission case to outside the vehicle. Once the hydraulic oil inside the first and second cancel oil chambers 37, 47 is discharged through the first and second passages 521, 522 of the sleeve 52, the hydraulic oil flows back to an oil pan (not shown) after being supplied to the lubrication target, i.e., the planetary gear mechanism 50, through the oil passage 303e formed in the stepped portion 303d of the inner cylinder portion 303 of the clutch drum 30, and a gap of the bearing 51.

Thus, when the automatic transmission 20 is operated with the first cancel oil chamber 37 filled with hydraulic oil and centrifugal hydraulic pressure is generated in the first cancel oil chamber 37, the centrifugal hydraulic pressure causes the inner circumferential portion 363 of the cancel plate 36 to press the second side wall portion 402 of the clutch drum 40 of the clutch C2 in the axial direction. Here, as described above, the inner circumferential portion 363 of the cancel plate 36 and the second side wall portion 402 of the clutch drum 40 are fastened by the fixing portion 304 of the clutch drum 30. Therefore, when the cancel plate 36 presses the clutch drum 40, the fulcrum point (portion where the clutch drum 40 and the clutch drum 30 are fastened) and the force point (section where the clutch drum 40 supports the cancel plate 36, i.e., portion of contact between the inner circumferential portion 363 of the cancel plate 36 and the second side wall portion 402 of the clutch drum 40) of a torsional moment that acts on the clutch drum 40 correspond to substantially the same position. Thus, a large torsional moment acting on the clutch drum 40 can be suppressed, and deformation of the clutch drum 40 can be well suppressed.

In the clutch C1 mounted in the automatic transmission 20 according to the embodiment described above, the first side wall portion 302 of the clutch drum 30 is formed with the plurality of oil passages 302a, each of which radially extends and is in communication with the first engagement side oil chamber 34, and the plurality of second oil passages 302c, each of which radially extends and is in communication with the first cancel oil chamber 37. In the embodiment described above, the axial width Da of the first oil passage 302a and the axial width Dc of the second oil passage 302c are set uniform. That is, the second oil passage 302c is included within the range of the axial width Da of the first oil passage 302a, and the first oil passage 302a is included within the range of the axial width Dc of the second oil passage 302c. Thus, the first oil passages 302a for supplying oil to the first engagement side oil chamber 34 and the second oil passages 302c for supplying oil to the first cancel oil chamber 37 are formed on substantially the same plane within the first side wall portion 302 of the clutch drum 30. Therefore, the first and second oil passages 302a, 302c are not formed parallel in the axial direction, and an increase in the axial length of the clutch C1 as well as that of the automatic transmission 20 that includes the clutch C1 and the clutch C2 can be suppressed. In addition, the first and second oil passages 302a, 302c are both formed within the first side wall portion 302 of the clutch drum 30. There is thus no need to use a separate member for forming the oil passages. Moreover, an increase in the number of parts can be suppressed and the clutch C1 can have a more simple and downsized configuration. Consequently, according to the clutch C1 mounted in the automatic transmission 20 of the embodiment, a hydraulic clutch with a compact and simple configuration can be achieved. However, the axial width Da of the first oil passage 302a and the axial width Dc of the second oil passage 302c are not necessarily set uniform. That is, if at least one of the first and second oil passages 302a, 302c is included within the range of the axial width of the other of the first and second oil passage 302a, 302c, an increase in the axial length of the clutch C1 as well as that of the automatic transmission 20 can be suppressed.

The first oil passage 302a and the second oil passage 302c are each formed in the first side wall portion 302 of the clutch drum 30 so as to alternate with each other in a radiating manner. By thus forming the first and second oil passages 302a, 302c so as to alternate with each other in a radiating manner, the first oil passages 302a and the second oil passages 302c do not overlap with each other as viewed from the axial direction, and an increase in the axial length of the clutch C1 as well as that of the automatic transmission 20 can be suppressed. In addition, oil can be equally supplied to the first engagement side oil chamber 34 and the first cancel oil chamber 37 formed into ring shapes.

Further, the first and second oil passages 302a, 302c are each formed from the hole portion that is formed penetrating radially inward from the outer periphery of the first side wall portion 302 of the clutch drum 30, and the opening portion of the hole portion positioned on the outer circumferential side of the first side wall portion 302 is closed by the plug (lid element) 54. Thus, the first and second oil passages 302a, 302c can be easily formed.

The clutch C2 serves as a second hydraulic clutch. The clutch C2 includes the clutch drum 40 that serves as the second clutch drum and is disposed circumferentially inward of the clutch drum 30; the clutch hub 41 that is disposed circumferentially inward of the clutch drum 40; the plurality of clutch plates 42, 43 that is fitted in an alternating manner on an inner periphery of the clutch drum 40 and an outer periphery of the clutch hub 41; and the clutch piston (second clutch piston) 45 that defines together with the clutch drum 30 a second engagement side oil chamber 44, and can move in the axial direction so as to press the clutch plates 42, 43 by hydraulic pressure supplied to the second engagement side oil chamber 44. The ring-shaped fixing portion 304 axially extends from the first side wall portion 302 of the clutch drum 30. The aligning portion 305 is formed axially extending from the inner circumferential side of the fixing portion 304. The cancel plate 36 of the clutch C1 and the clutch drum 40 are fitted to the aligning portion 305 of the fixing portion 304, and the second oil passage 302c is in communication with the first cancel oil chamber 37 through the oil passage 302d formed in the fixing portion 304 of the clutch drum 30. It is thus possible to dispose the clutch C1 and the clutch C2 so as to overlap as viewed from the radial direction with the second oil passage 302c and the first cancel oil chamber 37 in communication with each other.

In the automatic transmission 20 provided with the clutch C1 of the embodiment, the clutch drum 30 includes the inner cylinder portion 303 axially extending from the inner circumferential portion of the first side wall portion 302. The inner cylinder portion 303 is press-fit with the cylindrical sleeve 52 that is rotatably supported by the fixed member 600 of the automatic transmission 20 so as to enable the sleeve 52 to rotate together with the inner cylinder portion 303. The first oil passage 302a is in communication with the supply passage 31a formed in the fixed member 600 through the oil hole 52a formed in the sleeve 52 and the relay oil passage 303a formed in the inner cylinder portion 303. The second oil passage 302c is in communication with the supply passage 31c formed in the fixed member 600 through the oil hole 52c formed in the sleeve 52 and the relay oil passage 303c formed in the inner cylinder portion 303. Thus, even if the supply passages 31a, 31c formed in the fixed member 600 of the automatic transmission 20 have a simplified structure, the first and second oil passages 302a, 302c can easily be in respective communication with the supply passages 31a and 31c.

The automatic transmission 20 provided with the clutch C1 of the embodiment further includes the clutch C2 that is disposed inward of the clutch C1 so as to overlap with the clutch C1 as viewed from the radial direction. The present invention is thus well suited for the hydraulic clutch that is disposed circumferentially outward. In other words, according to the present invention, an increase in the axial length of the automatic transmission 20 can be suppressed, while also supplying hydraulic oil to the first engagement side oil chamber 34 and the first cancel oil chamber 37 of the clutch C1 that is disposed outward of the clutch C2 that serves as the second hydraulic clutch.

Figure 7:
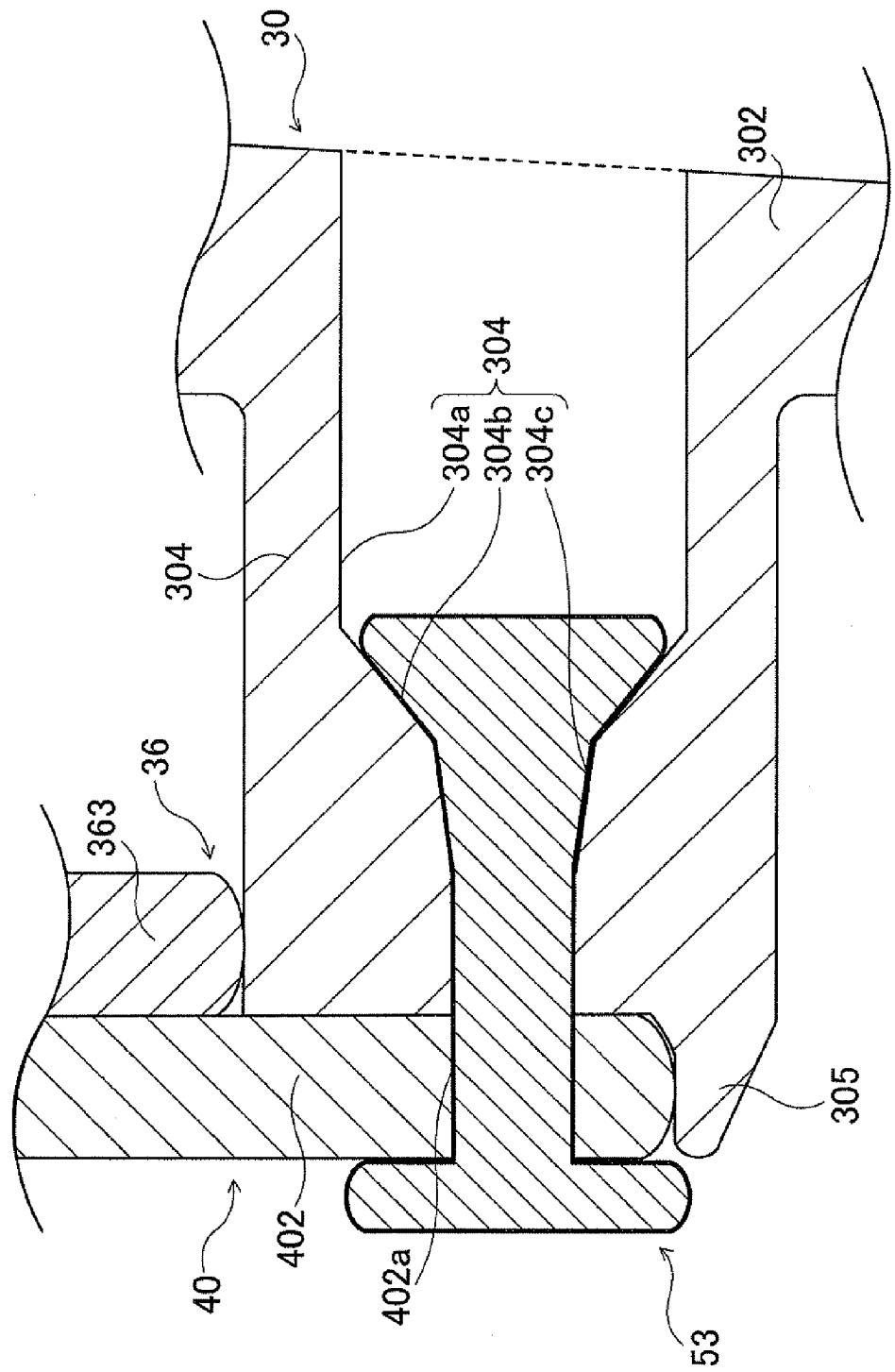
FIG. 7 is an enlarged sectional view that shows the fixing portion 304 of the clutch drum 30 and the surrounding area.

Note that, as shown in FIG. 7, the cancel plate 36 may not be fastened to the fixing portion 304, provided that an end surface of the inner circumferential portion 363 on the left side of the figure is supported by the clutch drum 40 in the vicinity of the coupled portions of the clutch drum 30 and the clutch drum 40. Further note that the hydraulic clutch of the present invention is not limited to the automatic transmission 20 of the embodiment, and may obviously be applied to a manual transmission as well.

Here, the correspondence between main elements of the embodiment and main elements of the invention as described in the Summary of the Invention will be explained. In the embodiment, the clutch C1 including the clutch drum 30 that includes at least the first outer cylinder portion 301 that holds the plurality of clutch plates 32, 33, and the first side wall portion 302 that extends radially inward from the first outer cylinder portion 301; the clutch piston 35 that defines together with the clutch drum 30 the first engagement side oil chamber 34 and can move in the axial direction by hydraulic pressure supplied to the first engagement side oil chamber 34 and press the clutch plates 32, 33; and the cancel plate 36 that together with the clutch piston 35 defines the first cancel oil chamber 37 for canceling centrifugal hydraulic pressure corresponds to a "hydraulic clutch". The first oil passages 302a formed in the first side wall portion 302 of the clutch drum 30 correspond to "first oil passages". The second oil passages 302c that are in communication with the first cancel oil chamber 37 and formed in a radiating manner in the first side wall portion 302 so as not to overlap with the first oil passages 302a as viewed from the axial direction correspond to a "second oil passages". The clutch C2 that is disposed inward of the clutch C1 so as to overlap with the clutch C1 as viewed from the radial direction corresponds to a "second hydraulic clutch". The automatic transmission 20 corresponds to a "transmission device".

Note that with regard to the correspondence between the main elements of the embodiment and the main elements of the invention as listed in the Summary of the Invention, the embodiment is only one specific example for carrying out the invention explained in the Summary of the Invention. This correspondence does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe an example for carrying out the present invention. However, the present invention is not particularly limited to such an example, and may obviously be carried out using various embodiments without departing from the scope of the present invention.

The present invention can be utilized in the manufacturing industry for hydraulic clutches and transmission devices provided with the same.

What is claimed is:

1. A hydraulic clutch comprising:
    a clutch drum that includes at least:
        an outer cylinder portion that is fitted with a plurality of clutch plates and axially extends,
        an inner cylinder portion that axially extends at a radial inner side of the outer cylinder portion, and a side wall portion that radially connects the outer cylinder portion and the inner cylinder portion;

a clutch piston that defines together with the clutch drum an engagement side oil chamber, and moves in an axial direction so as to press the clutch plates by hydraulic pressure supplied to the engagement side oil chamber; and a cancel plate that defines together with the clutch piston a cancel oil chamber that cancels centrifugal hydraulic pressure, wherein:

the side wall portion of the clutch drum is formed with a first oil passage that radially extends and is in communication with the engagement side oil chamber, and a second oil passage that radially extends and is in communication with the cancel oil chamber, and one of the first and second oil passages is at least partially included in a range of an axial width of the other of the first and second oil passages in the side wall portion.

2. The hydraulic clutch according to claim 1, wherein the first oil passage and the second oil passage are each formed in a plurality in the side wall portion of the clutch drum so as to alternate with each other in a radiating manner.

3. The hydraulic clutch according to claim 1, wherein the first and second oil passages are each formed from a hole portion that is formed penetrating radially inward from an outer periphery of the side wall portion of the clutch drum, and an opening portion of the hole portion positioned on an outer circumferential side of the side wall portion is closed by a lid element.

4. A transmission device provided with the hydraulic clutch according to claim 1, wherein:

the hydraulic clutch is a first hydraulic clutch, the transmission device further includes a second hydraulic clutch that is disposed circumferentially inward of the first hydraulic clutch, and the first and second oil passages extend to radially outside rather than to an engagement side oil chamber of the second hydraulic clutch.

5. The transmission device according to claim 4, wherein the second hydraulic clutch includes a second clutch drum that is disposed circumferentially inward of the clutch drum, a clutch hub that is disposed circumferentially inward of the second clutch drum, a plurality of second clutch plates that is fitted in an alternating manner to an inner periphery of the second clutch drum and an outer periphery of the clutch hub, and a second clutch piston that defines together with the clutch drum a second engagement side oil chamber, and moves in the axial direction so as to press the second clutch plates by hydraulic pressure supplied to the second engagement side oil chamber, wherein a ring-shaped fixing portion axially extends from the side wall portion of the clutch drum, and an aligning portion is formed axially extending from an inner circumferential side of the fixing portion, and the cancel plate of the first hydraulic clutch and the second clutch drum are fitted to the aligning portion of the fixing portion, and the second oil passage is in communication with the cancel oil chamber through an oil passage formed in the fixing portion of the clutch drum.

6. The transmission device according to claim 4, wherein the clutch drum includes an inner cylinder portion that axially extends from an inner circumferential portion of the side wall portion, and the inner cylinder portion is fitted with a cylindrical sleeve that is rotatably supported by a fixed member of the transmission device such that the sleeve rotates together with the inner cylinder portion, and the first oil passage is in communication with a first supply passage formed in the fixed member through a first oil hole formed in the sleeve and a first relay oil passage formed in the inner cylinder portion, and the second oil passage is in communication with a second supply passage formed in the fixed member through a second oil hole formed in the sleeve and a second relay oil passage formed in the inner cylinder portion.

7. The hydraulic clutch according to claim 1, wherein the clutch drum comprises a ring shape portion that axially extends and is disposed between the outer cylinder portion and the inner cylinder portion in a radial direction, and wherein the second oil passage communicates between the second oil passage and the cancel oil chamber via a third oil passage that axially extends in the ring shape portion.

8. A hydraulic clutch comprising:

a clutch drum that includes at least an outer cylinder portion that is fitted with a plurality of clutch plates, and a side wall portion;

a clutch piston that defines together with the clutch drum an engagement side oil chamber, and moves in an axial direction so as to press the clutch plates by hydraulic pressure supplied to the engagement side oil chamber; and a cancel plate that defines together with the clutch piston a cancel oil chamber that cancels centrifugal hydraulic pressure, wherein the side wall portion of the clutch drum is formed with a first oil passage that radially extends and is in communication with the engagement side oil chamber, and a second oil passage that radially extends and is in communication with the cancel oil chamber, and one of the first and second oil passages is at least partially included in a range of an axial width of the other of the first and second oil passages, wherein the first and second oil passages are each formed from a hole portion that is formed penetrating radially inward from an outer periphery of the side wall portion of the clutch drum, and an opening portion of the hole portion positioned on an outer circumferential side of the side wall portion is closed by a lid element.

9. A hydraulic clutch comprising:

a clutch drum that includes at least an outer cylinder portion that is fitted with a plurality of clutch plates, and a side wall portion;

a clutch piston that defines together with the clutch drum an engagement side oil chamber, and moves in an axial direction so as to press the clutch plates by hydraulic pressure supplied to the engagement side oil chamber; and a cancel plate that defines together with the clutch piston a cancel oil chamber that cancels centrifugal hydraulic pressure, wherein the side wall portion of the clutch drum is formed with a first oil passage that radially extends and is in communication with the engagement side oil chamber, and a second oil passage that radially extends and is in communication with the cancel oil chamber, and one of the first and second oil passages is at least partially included in a range of an axial width of the other of the first and second oil passages, wherein the hydraulic clutch is a first hydraulic clutch,
wherein the transmission device further includes a second hydraulic clutch that is disposed circumferentially inward of the first hydraulic clutch,
wherein the second hydraulic clutch includes
- a second clutch drum that is disposed circumferentially inward of the clutch drum,
- a clutch hub that is disposed circumferentially inward of the second clutch drum,
- a plurality of second clutch plates that is fitted in an alternating manner to an inner periphery of the second clutch drum and an outer periphery of the clutch hub, and
- a second clutch piston that defines together with the clutch drum a second engagement side oil chamber, and moves in the axial direction so as to press the second clutch plates by hydraulic pressure supplied to the second engagement side oil chamber, wherein a ring-shaped fixing portion axially extends from the side wall portion of the clutch drum, and
wherein an aligning portion is formed axially extending from an inner circumferential side of the fixing portion, and the cancel plate of the first hydraulic clutch and the second clutch drum are fitted to the aligning portion of the fixing portion, and
wherein the second oil passage is in communication with the cancel oil chamber through an oil passage formed in the fixing portion of the clutch drum.

* * * * *